United States Patent
Soman et al.

(10) Patent No.: US 11,601,461 B2
(45) Date of Patent: Mar. 7, 2023

(54) RISK-BASED CLOUD PROFILE MANAGEMENT FOR VDI IN THE CLOUD

(71) Applicant: VMware, Inc., Palo Alto, CA (US)

(72) Inventors: Sisimon Soman, Sunnyvale, CA (US); Arun Padoor Chandramohan, Singapore (SG)

(73) Assignee: VMware, Inc., Palo Alto, CA (US)

( * ) Notice: Subject to any disclaimer, the term of this patent is extended or adjusted under 35 U.S.C. 154(b) by 526 days.

(21) Appl. No.: 16/740,923

(22) Filed: Jan. 13, 2020

(65) Prior Publication Data

US 2021/0218766 A1 Jul. 15, 2021

(51) Int. Cl.
*H04L 9/40* (2022.01)
*G06F 9/451* (2018.01)
*G06F 9/455* (2018.01)
*G06F 21/62* (2013.01)
*G06F 21/60* (2013.01)

(52) U.S. Cl.
CPC .......... *H04L 63/1433* (2013.01); *G06F 9/452* (2018.02); *G06F 9/45558* (2013.01); *G06F 21/602* (2013.01); *G06F 21/6245* (2013.01); *H04L 63/1425* (2013.01); *G06F 2009/4557* (2013.01); *G06F 2009/45595* (2013.01)

(58) Field of Classification Search
CPC ............. H04L 63/1433; H04L 63/1425; G06F 21/6245; G06F 21/602; G06F 9/45558; G06F 9/452; G06F 2009/4557; G06F 2009/45595

See application file for complete search history.

(56) References Cited

U.S. PATENT DOCUMENTS

| 7,975,165 B2* | 7/2011 | Shneorson | G06Q 10/06 714/3 |
| 8,955,072 B2 | 2/2015 | Wilkinson et al. | |
| 2010/0169948 A1* | 7/2010 | Budko | G06F 21/53 706/53 |
| 2011/0004878 A1* | 1/2011 | Divoux | G06F 9/4856 718/1 |
| 2011/0131658 A1* | 6/2011 | Bahl | G06F 21/577 726/25 |

(Continued)

OTHER PUBLICATIONS

Scarfone, Karen, Paul Hoffman, and Murugiah Souppaya. "Guide to enterprise telework and remote access security." NIST Special Publication 800 (2009): 46. (Year: 2009).*

(Continued)

*Primary Examiner* — Syed A Zaidi
(74) *Attorney, Agent, or Firm* — Kim & Stewart LLP

(57) ABSTRACT

Data that includes user data and application data that is generated during a remote desktop session to a cloud computing system is stored in cloud storage according to a risk level of the remote desktop session. The storage device has provisioned therein a plurality of storage containers, including first and second storage containers, where the first storage container stores less percentage of the user data than the second storage container. The first storage container is selected for storing the user data if the determined risk level of the remote desktop session is at a first level and the second storage container is selected for storing the user data if the determined risk level of the remote desktop session is at a second level that is lower than the first level.

20 Claims, 4 Drawing Sheets

(56) References Cited

U.S. PATENT DOCUMENTS

| | | | |
|---|---|---|---|
| 2016/0232024 A1* | 8/2016 | Hamilton, II | G06F 21/53 |
| 2017/0163654 A1* | 6/2017 | Peppe | H04L 63/101 |
| 2017/0373853 A1 | 12/2017 | Soman | |
| 2018/0198824 A1* | 7/2018 | Pulapaka | G06F 9/455 |
| 2018/0255077 A1* | 9/2018 | Paine | H04L 63/1416 |
| 2018/0336351 A1* | 11/2018 | Jeffries | G06F 21/566 |
| 2018/0359237 A1* | 12/2018 | Shemtov | H04L 63/1433 |
| 2019/0075130 A1* | 3/2019 | Petry | H04L 63/1483 |
| 2019/0116200 A1* | 4/2019 | Joy | G06F 11/301 |
| 2020/0228561 A1* | 7/2020 | Petry | G06F 21/53 |

OTHER PUBLICATIONS

NPL Search Terms (Year: 2022).*

* cited by examiner

RISK-BASED CLOUD PROFILE MANAGEMENT FOR VDI IN THE CLOUD

BACKGROUND

Cloud Service providers offer various types of storage services such as block, file, and object-based storage services, to various type of database services such as relational and NoSQL databases. Due to reasons such as simplicity and cost effectiveness, nowadays, most cloud storage providers primarily offer object-based storage services. While customers actively look at cloud-based virtual desktop infrastructure (VDI) for reasons like flexibility and costs savings, they also have increasing concerns around how security is managed for cloud-based VDI and cloud storage. Moving to the cloud will require rearchitecting how user data (e.g., data created by the user for storage in the cloud, such as data created from running applications) and user profiles (which may include user preferences, such as a user's favorite websites, user's preferred font styles, most frequently used applications to be pinned to a quick access portion of a display, etc.) are accessed and secured.

A user profile includes personal data associated with a specific user, such as a user's customized desktop environment (e.g., type of wallpaper used for display on the user's computer, bookmarks, website usernames and passwords for web browsers used by the user, application customization data, etc.). A user profile may be considered in some respects to be a digital representation of a user's identity. User application data, in contrast, corresponds to data created when a user runs a particular application, such as a spreadsheet application. When a user accesses a remote desktop in a cloud-based VDI, user profile data and user application data are stored in cloud-based storage, which may not meet the security requirements of enterprises.

SUMMARY

One or more embodiments provide techniques for determining a risk level associated with a user session for accessing a cloud-based VDI. Based on the determined risk level, different amounts of user profile data and/or user data stored in the cloud network is made accessible to the user for the user session.

According to one embodiment, user data that is generated during a remote desktop session is stored in a cloud storage according to a risk level of the remote desktop session. The cloud storage has provisioned therein a plurality of storage containers, including first and second storage containers, where the first storage container stores less percentage of the user data than the second storage container. The first storage container is selected for storing the user data if the determined risk level of the remote desktop session is at a first level and the second storage container is selected for storing the user data if the determined risk level of the remote desktop session is at a second level that is lower than the first level. These containers may be encrypted with different keys.

Further embodiments include a non-transitory computer-readable storage medium comprising instructions that cause a computer system to carry out the above method, as well as a computer system configured to carry out the above method.

DETAILED DESCRIPTION

Figure 1:
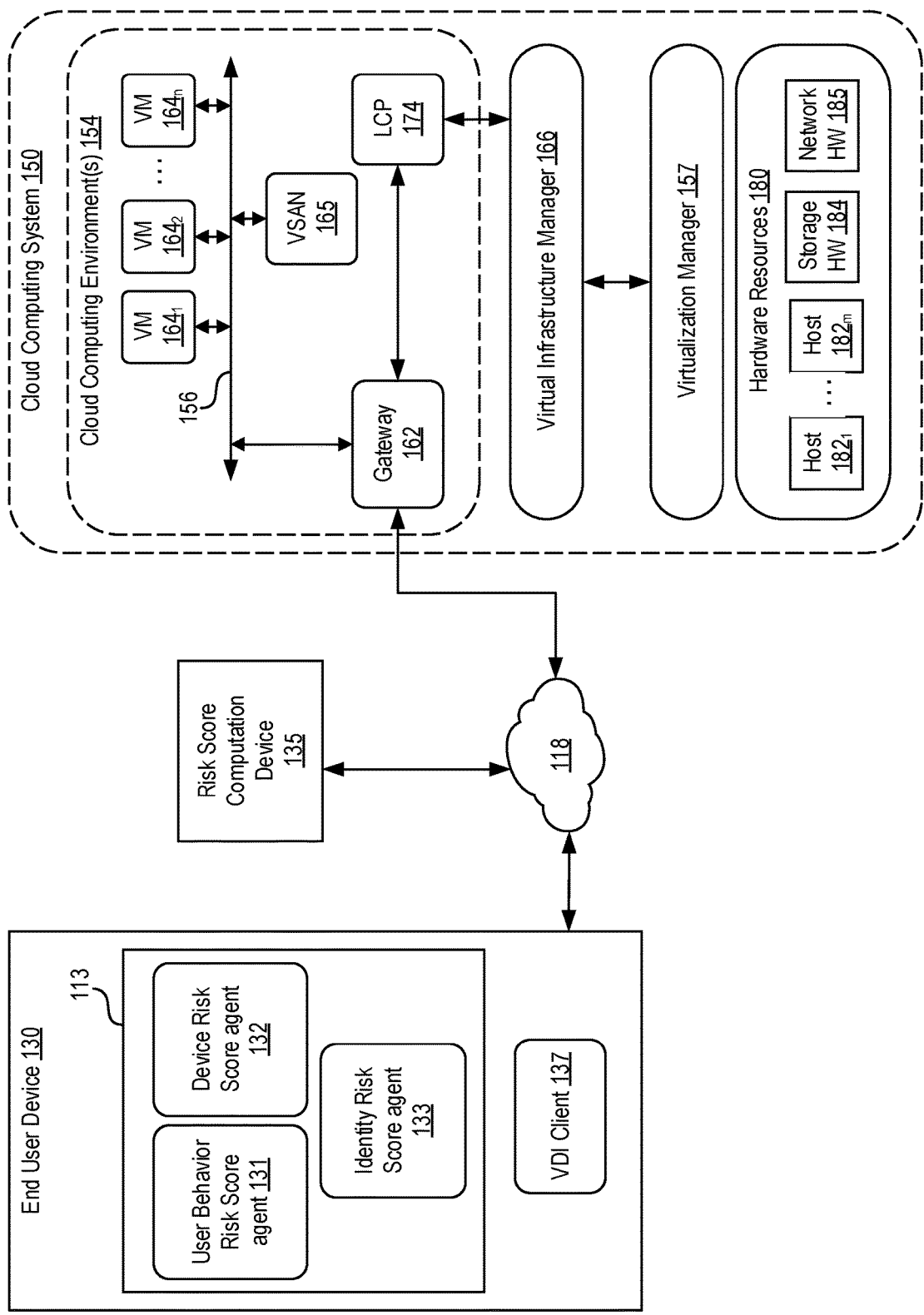
FIG. 1 is a block diagram showing an end user device connected to a cloud computing system, in which one or more embodiments may be implemented.

FIG. 1 illustrates a virtual desktop infrastructure (VDI) implemented in a cloud computing system 150, in which one or more embodiments may be implemented. FIG. 1 also illustrates end user device 130 that establishes a remote desktop session with a remote desktop of the VDI, which is deployed in cloud computing environment 154.

Cloud computing system 150 includes the following control plane components, a virtual infrastructure manager 166 and a virtualization manager 157, through which virtual compute, storage and network resources are provisioned for different customers of cloud computing system 150. Virtualization manager 157 is a virtualization management software executed in a physical or virtual server (e.g., VMware vCenter Server®), that cooperates with hypervisors installed in hosts $182_1$ to $182_m$ to provision virtual compute, storage and network resources from hardware resources 180, which include hosts $182_1$ to $182_m$, storage hardware 184, and network hardware 185. Virtual infrastructure manager 166 is a virtual infrastructure management software executed in a physical or virtual server (e.g., VMware vCloud Director®), that partitions the virtual compute, storage and network resources provisioned by virtualization manager 157, for the different customers of cloud computing system 150. As shown in FIG. 1, cloud computing system 150 may support multiple cloud computing environments 154, available to different customers in a multi-tenant configuration.

The virtual compute, storage, and network resources are provisioned in cloud computing environments 154 to form a virtual data center or a software-defined data center. The virtual data center includes one or more virtual networks 156 used to communicate amongst VMs $164_1$-$164_n$ (collectively referred to as VMs 164) and managed by at least one network gateway component (e.g., gateway 162). Gateway 162 (e.g., executing as a virtual appliance) is configured to provide VMs 164 and other components in cloud computing environment 154 with connectivity to an external network 118 (e.g., Internet). Gateway 162 manages external public IP addresses for the virtual data center and one or more private internal networks interconnecting VMs 164. Gateway 162 is configured to route traffic incoming to and outgoing from the virtual data center and provide networking services, such as firewalls, network address translation (NAT), dynamic host configuration protocol (DHCP), and load balancing. Gateway 162 may be configured to provide virtual private network (VPN) connectivity over a network 118 with another VPN endpoint, such as a gateway (not shown) within an on-premises (private) network or another cloud computing system.

Figure 2:
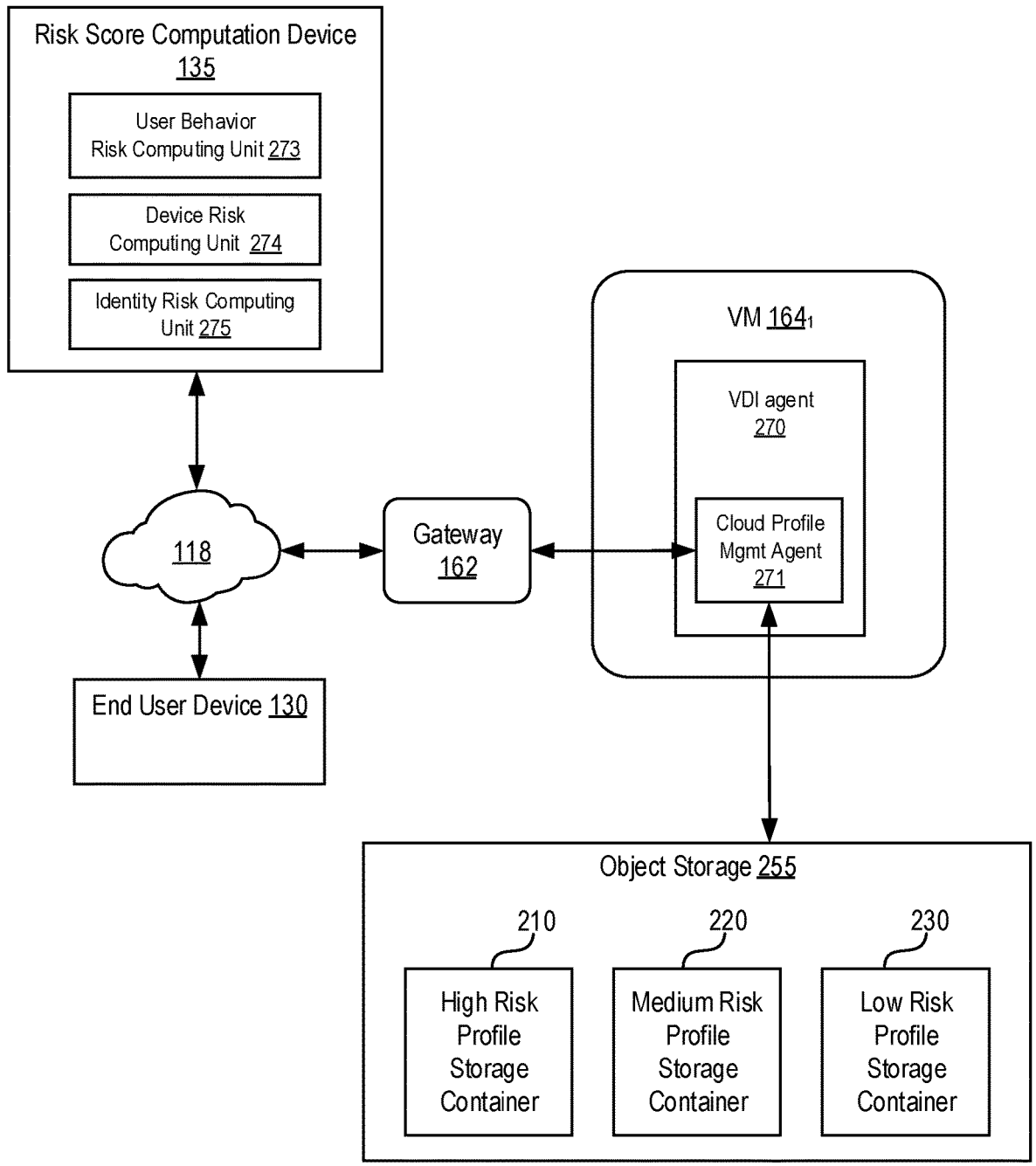
FIG. 2 is a block diagram showing components of a virtual machine that computes a session risk score based on information provided by an end user device, and different profile storage containers that are stored within cloud-based storage.

Storage service for VMs 164 in the virtual data center is provided by a virtual storage area network device, which is depicted in FIG. 1 as VSAN 165, which is provisioned from storage hardware 184. In addition to VSAN 165, VMs 164 also has access to an object-based storage, which is depicted in FIG. 2 as object storage 255, which is provided by cloud computing system 150. VMs 164 perform reads from and writes to object storage 255 using APIs. The virtual data center further includes a local control plane (LCP) 174, implemented as a physical or virtual server, configured to communicate with virtual infrastructure manager 166 and enable control-plane communications between an administrator computer (not shown) and virtual infrastructure manager 166.

End user device 130 is a computing device is typically a conventional computer that includes components (not shown) including one or more central processing units (CPUs), system memory, a network interface card (NIC), and local storage. The end user device could also be a phone, tablet or thinclient. End user device 130 has installed therein a VDI client 137, which when executed, establishes a remote desktop session with a remote desktop running in one of VMs 164. U.S. Pat. No. 8,955,072, which is incorporated herein by reference in its entirety, describes in detail how a remote desktop session is established between a client device such as end user device 130 and a remote desktop running in a VM.

End user device 130 employs a risk score data collection module 113 to monitor how the end user is accessing his or her remote desktop. Risk score data collection module 113 includes user behavior risk score agent 131, device risk score computing agent 132, and identity detection agent 133. User behavior risk score agent 131 monitors login behavior of a user. Such login behavior may be determined from network security application such as VMware Carbon Black®. Additionally, geolocation information associated with where the user is logging in from may be obtained as a factor for the user behavior risk score. For example, a user logging in from New York City and after having logged in from Shanghai, China two hours earlier may be considered high risk. Device risk score computing agent 132 monitors information about the device used to connect to the remote desktop. For example, when the device is the user's work computer located in an on-premises enterprise network, it is considered a low risk device. On the other hand, when the device is not located on-premises, it may be considered a high risk device if it connects to the remote desktop via a public Wi-Fi or a medium risk device if it connects to the remote desktop via a private Wi-Fi network. As another example, the dates of virus protection software and patches are monitored and that information sent to risk score computation device 135 so that if end user device 130 has not been updated with the most recent virus protection software and patches, it is considered a high risk device. Identity risk score agent 133 monitors actions of the user after the user has logged in. The monitored actions include biometric data obtained from the user of end user device 130 when logging into the remote desktop, keyboard clicks, and a sequence of applications opened by the user. These actions are compared against past actions performed by the particular user, and an identity risk score is computed as an indication of the likelihood that the person currently operating end user device 130 is highly likely, moderately likely, or unlikely to be the particular user. That is, even though someone has logged into end user device 130 with a particular user's username and password, actions performed by that user may be monitored and compared to actions performed by the particular user in past sessions, to assess the user identity risk of the current session. Identity risk score agent 133 also determines the time when the person currently operating end user device 130 is attempting to access the cloud, and compares that time to previous times when the particular user of end user device 130 accessed the cloud, to determine the likelihood that the person currently operating end user device 130 is the particular user.

In one embodiment, a security-related application, Workspace One Intelligence®, which is sold by VMware, may be used to monitor and compute the device risk score and the user identity risk score. Workspace One Intelligence™ analyzes patterns of user input, detects anomalies, and determines a risk associated with an end user device and an operator of an end user device based on the analyzed information.

The information acquired through user behavior risk score agent 131, device risk score agent 132, and identity risk score agent 133 is transmitted to a risk score computational device 135. With reference to FIG. 1 and FIG. 2, risk score computational device 135 is a physical or virtual appliance that executes a risk score computing application, e.g., software commercialized as VMware Workspace ONE Trust Network, which includes a user behavior risk scoring unit 273, which computes a user behavior risk score based on information acquired from user behavior risk score agent 131, a device risk scoring unit 274, which computes a device risk score based on information acquired from device risk score agent 132, and an identity risk scoring unit 275, which computes an identity risk score based on information acquired from identity risk score agent 133. Risk score computational device 135 computes a combined risk score based on, e.g., by summing, the user behavior risk score, the device risk score, and the identity risk score.

The combined risk score is sent to a remote desktop agent in the VM that is hosting the remote desktop of end user device 130, in particular to a cloud profile management (CPM) agent 271. CPM agent 271 determines based on the combined risk score, in which of the storage containers among a high risk profile storage container 210, a medium risk profile storage container 220, and a low risk profile storage container 230 within object storage 255, user profile data and user application data (hereinafter collectively referred to as "user data") should be stored. In addition, CPM agent 271 includes the functionality of a conventional service known as dynamic environment manager (DEM), which securely stores keys and profile container paths in memory of the VM.

When the combined risk score is high, user data is stored in high risk profile storage container 210. When the combined risk score is medium, user data is stored in medium risk profile storage container 220. When the combined risk score is low, user data is stored in low risk profile storage container 230. Of the three profile storage containers, high risk profile storage container 210 stores the least amount of user data, and low risk profile storage container 230 stores the most amount (virtually all, if not all) of user data. For example, user data that is highly confidential or highly sensitive is only stored in low risk profile storage container 230, and user data that is moderately confidential or moderately sensitive is stored in both medium risk profile storage container 220 and low risk profile storage container 230, but not in high risk profile storage container 210. By contrast, user data that is neither confidential nor sensitive is stored in all three storage containers. As such, the determination of which storage container user data is to be stored is based on the degree of sensitivity of that information. By way of example, health-related information of a user (e.g., height, weight, medicines taken daily by the user) may be considered "highly sensitive," whereas a user's home address, full name, cell phone number, etc., may be considered only "moderately sensitive."

For each end user of the cloud-based VDI, high risk profile storage container 210, medium risk profile storage container 220, and low risk profile storage container 230 are provisioned within object storage 255. When the three profile storage containers are initially provisioned, CPM agent 217 records their locations in cloud computing system 150 (e.g., paths or pointers to the profile storage containers) and generates keys for encrypting the content to be stored therein. In addition, if there is any user data such user data, after encryption, is stored in the three profiles storage containers in accordance with the above-described policy as to what type of user data can be stored in each of the three profiles storage containers. Also, as the end users generate user data during their remote desktop sessions, the three profile storage containers are each updated according to the above-described policy as to what type of user data can be stored therein, when the end users log out of their remote desktop sessions. Even if the data belongs to multiple containers, there is no requirement to have multiple copies of the same data. The containers are isolated and distinguished from each other by encryption keys, in which encryption keys are only handed out to the end user session after risk determination.

In some embodiments, storage containers may be designated based on the type of application that a user has attempted to open on his or her remote desktop. For those applications that deal with highly confidential or highly sensitive data, e.g., financial applications, a high security storage container may be provisioned in object storage 255. For those applications that deal with non-confidential and non-sensitive data, a low security storage container may be provisioned in object storage 255. In one embodiment, contents of the high security storage container are encrypted and the contents of the low security storage container are not encrypted. In another embodiment, contents of both the high security storage container and the low security storage container are encrypted with keys, but the key used to encrypt the contents of the high security storage container is more secure than the key used to encrypt the low security storage container. For example, the encryption key for the high security storage container has a longer bit length than the encryption key for the low security storage container, and/or is based on a more secure encryption standard.

In the embodiments illustrated herein, contents of each of high risk profile storage container 210, medium risk profile storage container 220, and low risk profile storage container 230 are encrypted with a key. In one embodiment, the encryption keys are generated using the same encryption standard. In another embodiment, the encryption key used for the high risk profile storage container is the least secure among the three and the encryption key used for the low risk profile storage container is the most secure among the three.

When a remote desktop session is assigned to a particular profile storage container, CPM agent 217 provides the VM hosting the remote desktop session with the corresponding key to encrypt information to be stored in that profile storage container and to decrypt the information retrieved from that profile storage container. In addition, the CPM agent 217 provides the VM with a location of that profile storage container within cloud computing system 150, e.g., a path or a pointer to that profile storage container within cloud computing system 150.

Figure 3:
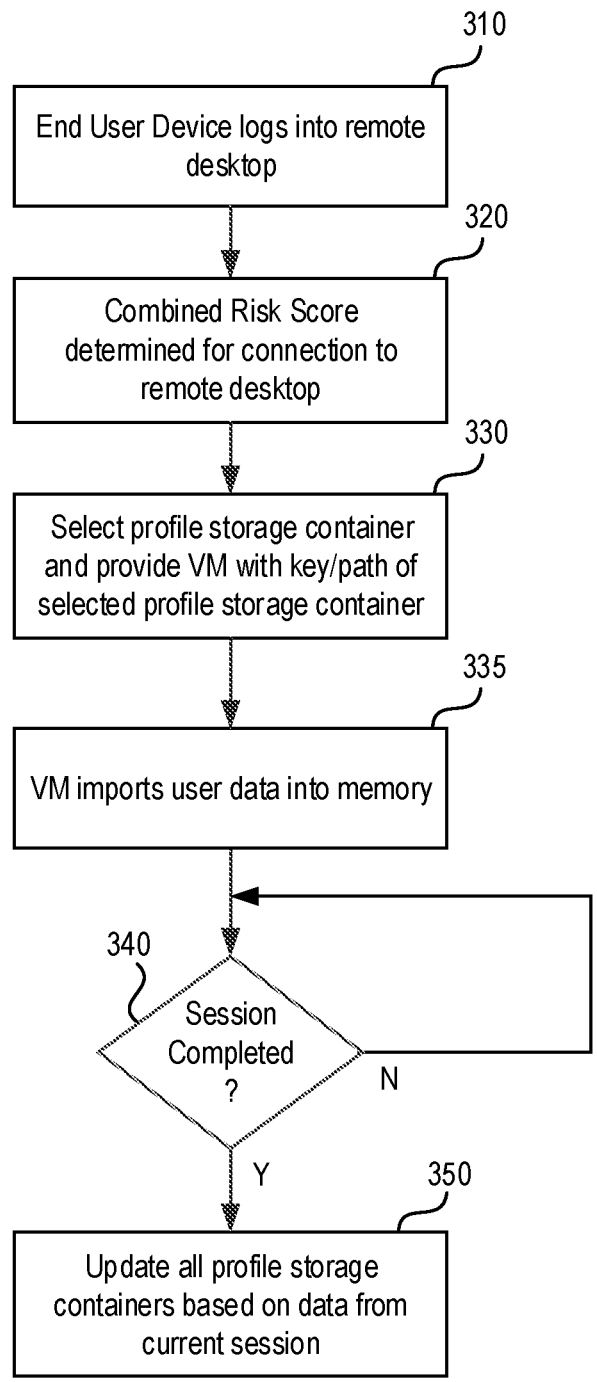
FIG. 3 is a flow diagram that illustrates a method of setting up a profile storage container for a remote desktop session between an end user device and a VM located within a cloud computing system, according to one or more embodiments.

FIG. 3 is a flow diagram that illustrates a method of setting up a profile storage container for a remote desktop session between an end user device (e.g., end user device 130) and a VM located within a cloud computing system (e.g., VM $164_1$), according to one or more embodiments. In step 310, the end user device logs into his or her remote desktop that is hosted in a VM located with the cloud computing system, using well-known techniques, one of which is described in U.S. Pat. No. 8,955,072. Then, after the remote desktop session has been established, the end user device transmits the information acquired through user behavior risk score agent 131, device risk score agent 132, and identity risk score agent 133 to risk score computational device 135, and in step 320, risk score computational device 135 computes the combined risk score from such information in the manner described above. In step 330, CPM agent 217 selects one of the three profile storage containers (among high risk profile storage container 210, medium risk profile storage container 220, and low risk profile storage container 230) based on the combined risk score computed in step 320, and provides the VM with the key and the path corresponding to the selected profile storage container. Thereafter, in step 335, the VM retrieves the user data from the selected profile storage container (using the path corresponding to the selected profile storage container), decrypts the retrieved data using the key, and loads the decrypted data into memory. In step 340, the VM monitors during the remote desktop session whether or not the user has logged out of the remote desktop session. If so, in step 350, any updates to the user data from the current session are selectively stored in the three profile storage containers according to the above-described policy as to what type of user data can be stored therein, after encrypting the selected updates using the corresponding keys of the three profile storage containers.

Figure 4:
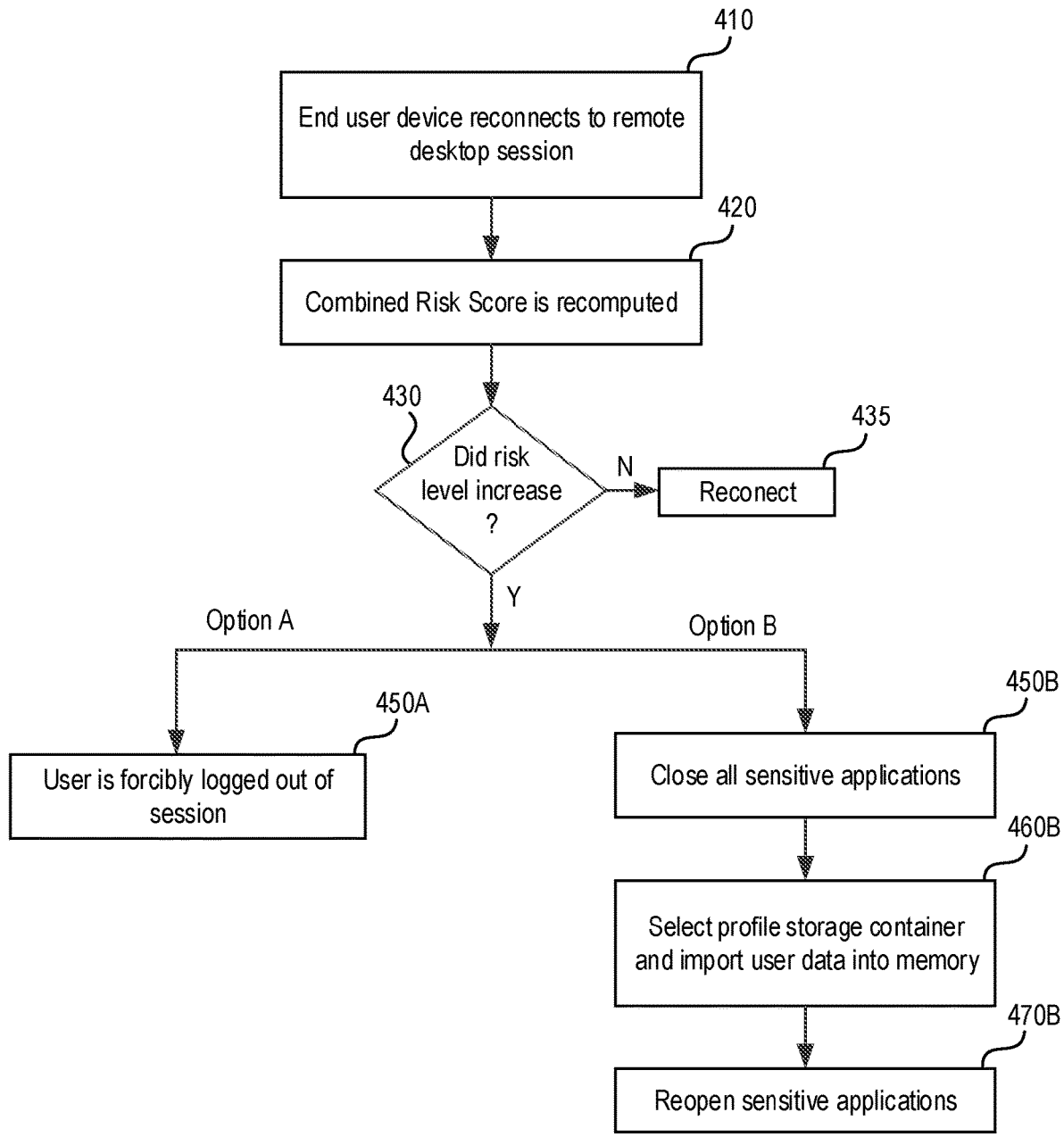
FIG. 4 is a flow diagram that illustrates a method of managing a reconnection to an existing remote desktop session between an end user device and a VM located within a cloud computing system, according to one or more embodiments.

FIG. 4 is a flow diagram that illustrates a method of managing a reconnection to an existing remote desktop session between an end user device (e.g., end user device 130) and a VM located within a cloud computing system (e.g., VM $164_1$), according to one or more embodiments. This may occur when the user disconnects the end user device from the VM without logging out of the remote desktop session, and reconnects from a different location using the same (or different) end user device or from the same location using a different end user device.

In step 410, the end user device reconnects to the remote desktop session. Upon reconnection, the end user device transmits the information acquired through user behavior risk score agent 131, device risk score agent 132, and identity risk score agent 133 to risk score computational device 135, and in step 420, risk score computational device 135 recomputes the combined risk score from such information in the manner described above.

If CPM agent 217 determines in step 430 that the risk level increased, e.g., from low to medium or from medium to high, CPM agent 217 forcibly logs the user out of the remote desktop session in step 450A (also causing step 350 to be executed) in one configuration. In an alternative configuration, instead of forcibly logging out the user, CPM agent 217 in step 450B closes all sensitive applications running on the remote desktop. Then, in step 460B, CPM agent 217 selects the higher risk-level profile storage container, provides the VM with the key and the path corresponding to the selected profile storage container, and imports user data stored in the selected the higher risk-level profile storage container into memory. In step 470B, CPM agent 217 reopens the sensitive applications that was closed in step 450B.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

What is claimed is:

1. A method of retrieving and storing, in cloud storage, data that includes user data and application data that is generated during a remote desktop session to a cloud computing system, the method comprising:

provisioning a plurality of storage containers, including a first storage container and a second storage container, in the cloud storage;

determining a risk level of the remote desktop session;

selecting the first storage container if the determined risk level of the remote desktop session is at a first level and the second storage container if the determined risk level of the remote desktop session is at a second level that is lower than the first level; and storing the user data in the selected storage container, wherein the first storage container stores less percentage of the user data than the second storage container.

2. The method of claim 1, wherein the remote desktop session is established between an end user device of a user and a virtual machine provisioned in the cloud computing system, and the cloud storage is provided by the cloud computing system.

3. The method of claim 2, wherein the risk level is determined from a score that is computed based on a login behavior of the user, and a location from which the end user device is logged into the remote desktop session.

4. The method of claim 1, wherein the second storage container stores one or more types of user data that the first storage container does not.

5. The method of claim 4, wherein the second storage container stores user data that is sensitive and user data that is confidential and the first storage container does not store user data that is sensitive and does not store user data that is confidential.

6. The method of claim 1, further comprising:

upon logging into the remote desktop session, retrieving the user data from the selected storage container; and upon logging out of the remote desktop session, storing the user data selectively in each of the storage containers, wherein the amount of the user data selectively stored in the first storage container is less than that stored in the second storage container.

7. The method of claim 6, wherein each of the storage containers is associated with a key for encrypting content to be stored therein, and the retrieved user data is decrypted with the key and the user data to be stored in the storage containers is encrypted with the key.

8. The method of claim 6, further comprising:
after logging into the remote desktop session and prior to logging out of the remote desktop session, upon detecting that an end user device has disconnected from the remote desktop session and then reconnected to the remote desktop session, determining a new risk level of the remote desktop session; and
if the new risk level is higher than the risk level of the remote desktop session prior to the disconnection and the reconnection, forcibly logging out the end user device from the remote desktop session.

9. The method of claim 6, further comprising:
after logging into the remote desktop session and prior to logging out of the remote desktop session, upon detecting that an end user device has disconnected from the remote desktop session and then reconnected to the remote desktop session, determining a new risk level of the remote desktop session; and
if the new risk level is higher than the risk level of the remote desktop session prior to the disconnection and the reconnection, closing all sensitive applications currently running in the remote desktop session, selecting another storage container, importing user data from said another storage container into memory, and reopening the sensitive applications.

10. A non-transitory computer-readable medium comprising instructions to be executed in a computer system, wherein the instructions when executed in the computer system cause the computer system to carry out a method of retrieving and storing, in cloud storage that is provisioned with a plurality of storage containers, user data that includes user data and application data that is generated during a remote desktop session to a cloud computing system, the method comprising:
determining a risk level of the remote desktop session;
selecting a first storage container if the determined risk level of the remote desktop session is at a first level and a second storage container if the determined risk level of the remote desktop session is at a second level that is lower than the first level; and
storing the user data in the selected storage container, wherein the first storage container stores less percentage of the user data than the second storage container.

11. The non-transitory computer-readable medium of claim 10, wherein the remote desktop session is established between an end user device of a user and a virtual machine provisioned in the cloud computing system, and the cloud storage device is provided by the cloud computing system.

12. The non-transitory computer-readable medium of claim 11, wherein the risk level is determined from a score that is computed based on a login behavior of the user, and a location from which the end user device is logged into the remote desktop session.

13. The non-transitory computer-readable medium of claim 10, wherein the second storage container stores one or more types of user data that the first storage container does not.

14. The non-transitory computer-readable medium of claim 13, wherein the second storage container stores user data that is sensitive and user data that is confidential and the first storage container does not store user data that is sensitive and does not store user data that is confidential.

15. The non-transitory computer-readable medium of claim 10, wherein the method further comprises:
upon logging into the remote desktop session, retrieving the user data from the selected storage container; and
upon logging out of the remote desktop session, storing the user data selectively in each of the storage containers,
wherein the amount of the user data selectively stored in the first storage container is less than that stored in the second storage container.

16. The non-transitory computer-readable medium of claim 15, wherein
each of the storage containers is associated with a key for encrypting content to be stored therein, and
the retrieved user data is decrypted with the key and the user data to be stored in the storage containers is encrypted with the key.

17. The non-transitory computer-readable medium of claim 15, wherein the method further comprises:
after logging into the remote desktop session and prior to logging out of the remote desktop session, upon detecting that an end user device has disconnected from the remote desktop session and then reconnected to the remote desktop session, determining a new risk level of the remote desktop session; and
if the new risk level is higher than the risk level of the remote desktop session prior to the disconnection and the reconnection, forcibly logging out the end user device from the remote desktop session.

18. The non-transitory computer-readable medium of claim 15, wherein the method further comprises:
after logging into the remote desktop session and prior to logging out of the remote desktop session, upon detecting that an end user device has disconnected from the remote desktop session and then reconnected to the remote desktop session, determining a new risk level of the remote desktop session; and
if the new risk level is higher than the risk level of the remote desktop session prior to the disconnection and the reconnection, closing all sensitive applications currently running in the remote desktop session, selecting another storage container, importing user data from said another storage container into memory, and reopening the sensitive applications.

19. A cloud computing system comprising:
one or more computing devices in which a plurality of virtual machines are provisioned; and
one or more storage devices that are configured as a cloud storage that is provisioned with a plurality of storage containers, including a first storage container and a second storage container,
wherein one of the virtual machines hosts a remote desktop session and includes a profile management agent that executes a method of retrieving and storing user data that includes user data and application data that is generated during the remote desktop session to a cloud computing system, the method comprising:
provisioning a plurality of storage containers, including first and second storage containers, in the cloud storage;
determining a risk level of the remote desktop session;
selecting the first storage container if the determined risk level of the remote desktop session is at a first level and the second storage container if the determined risk level of the remote desktop session is at a second level that is lower than the first level; and
storing the user data in the selected storage container, and
wherein the first storage container stores less percentage of the user data than the second storage container.

20. The system of claim 19, wherein the cloud storage is an object-based storage and each of the storage containers is associated with a key for encrypting content to be stored therein.

* * * * *